United States Patent
Ooshima et al.

(10) Patent No.: US 6,437,917 B1
(45) Date of Patent: *Aug. 20, 2002

(54) DIRECTIONAL REFLECTION SCREEN AND DISPLAY SYSTEM USING THE SAME

(75) Inventors: Tetsuya Ooshima, Kokubunji; Yoshiyuki Kaneko, Hachioji; Akira Arimoto, Kodaira, all of (JP)

(73) Assignee: Hitachi, Ltd., Tokyo (JP)

( * ) Notice: Subject to any disclaimer, the term of this patent is extended or adjusted under 35 U.S.C. 154(b) by 79 days.

This patent is subject to a terminal disclaimer.

(21) Appl. No.: 09/592,432

(22) Filed: Jun. 12, 2000

Related U.S. Application Data

(63) Continuation of application No. 08/995,876, filed on Dec. 22, 1997, now abandoned.

(30) Foreign Application Priority Data

Dec. 24, 1996 (JP) ............................... 8-343377

(51) Int. Cl.[7] .................................................. G02B 5/02
(52) U.S. Cl. ...................... 359/599; 359/457; 359/450
(58) Field of Search ................................. 359/599, 459, 359/831, 832, 833, 834, 835, 836, 837, 626, 458, 457; 362/31, 32; 349/8, 15

(56) References Cited

U.S. PATENT DOCUMENTS

| | | | |
|---|---|---|---|
| 3,966,301 A | 6/1976 | Brown | |
| 4,710,760 A | * 12/1987 | Kasday | ..................... 340/712 |
| 4,871,233 A | 10/1989 | Sheiman | |
| 4,906,070 A | 3/1990 | Cobb, Jr. | |
| 5,550,657 A | 8/1996 | Tanaka et al. | |
| 5,644,369 A | 7/1997 | Jachimowicz et al. | |
| 5,754,344 A | 5/1998 | Fujiyama | |
| 5,796,446 A | * 8/1998 | Marcellin-Dibon | ......... 348/744 |

OTHER PUBLICATIONS

Y. Ohkoshi, "Three–Dimensional Image Engineering", published by Asakura Shoten, pp. 28 and 91–97.

* cited by examiner

*Primary Examiner*—Cassandra Spyrou
*Assistant Examiner*—Euncha Cherry
(74) *Attorney, Agent, or Firm*—Mattingly, Stanger & Malur, P.C.

(57) ABSTRACT

A display system has a directional reflection screen with a triangularly-shaped mirror sheet as horizontal focusing for observers and stereoscopic image projecting means. The directional reflection screen has a triangularly-shaped mirror sheet with included angles at least some of which are non-right angles. This enables a plurality of observers to simultaneously obtain a stereoscopic view using a binocular parallax without wearing special glasses and without having to position themselves in a very limited number of positions relative to the screen. Vertical diffusion can also be provided by using a lens sheet. The screen can be made concave in the horizontal or vertical directions, or both.

18 Claims, 17 Drawing Sheets

INCIDENCE OF IMAGE SIGNAL

DIRECTIONAL REFLECTION SCREEN AND DISPLAY SYSTEM USING THE SAME

This is a continuation application of U.S. Ser. No. 08/995,876, filed Dec. 22, 1997 now abandoned.

FIELD OF THE INVENTION

The present invention relates to a directional reflection screen and display system which enables an observer to obtain a stereoscopic view using a binocular parallax without wearing special glasses.

BACKGROUND OF THE INVENTION

A display system which enables an observer to obtain a stereoscopic view using a binocular parallax without wearing special glasses uses a combination of image projecting means and a directional reflection or transmission screen. A directional reflection screen which uses a corner-shaped mirror sheet as horizontal focusing means for an observer is disclosed in, for example, "THREE-DIMENSIONAL IMAGE ENGINEERING", (written by Yoshitaka Ohkoshi, published by Asakura Shoten), pp. 28 and 91–97. Such a directional reflection screen is illustrated in FIGS. 15 and 16.

The screen S01, shown in FIG. 15, enables horizontal focusing by providing a corner-shaped mirror sheet 10R having right angles at the peaks and valleys, and vertical diffusion by providing a mirror surface 11 having appropriate unevenness, where the unevenness may resemble a sinusoidal curve. The screen S02, shown in FIG. 16, enables vertical diffusion by providing a surface 21 with a lens effect on corner-shaped mirror sheet 10R.

As shown in FIG. 17, in either of these conventional corner-shaped mirror sheets 10R of FIGS. 15 and 16, rays 41i and 42i which are incident on mirror surfaces 11i are respectively reflected in the same horizontal direction that the incident rays come from as reflected rays 41r and 42r. Accordingly, a picture signal, which is emitted from an image projecting apparatus such as a liquid crystal projector and is projected on the screen shown in FIG. 15 or 16, is reflected and focused on the position of the image projecting apparatus in a horizontal direction. Specifically, as shown in FIG. 18, image projecting means 50, which includes, a right-eye projector 50R and a left-eye projector 50L, is disposed immediately above or below a right eye 60R and a left eye 60L of an observer 60. A pair of picture signals which form a stereoscopic image signal, based on a binocular parallax effect, are projected on a directional reflection screen S00 which is similar to screen S01 of FIG. 15, whereby the observer 60 can observe a stereoscopic picture.

However, such a directional reflection screen for the above-described prior art stereoscopic display has only one focus point in a horizontal direction. Thus, a plurality of observers cannot simultaneously observe a stereoscopic image without an observation platform which enables the observers to overlap each other in a vertical direction.

SUMMARY OF THE INVENTION

An object of the present invention is to provide a stereoscopic display system which overcomes the above-mentioned problem as well as other problems of the prior art and allows a plurality of observers to simultaneously observe a stereoscopic image without wearing special glasses and without having to be vertically positioned with respect to each other as required by the prior art.

To solve the problems of the prior art, the present invention provides a display system having image projecting means and a directional reflection screen. The directional reflection screen includes horizontal focusing means for an observer. Horizontal focusing is enabled by a mirror sheet shaped to have a plurality of triangularly-shaped ridges that have included angles, at least some of which are non-right angles. Such a mirror sheet is referred to herein as a triangularly-shaped mirror sheet.

The present invention provides a directional reflection screen with a triangularly-shaped mirror sheet in which the included angles which are the non-right angles include a plurality of different included angles.

The present invention provides a directional reflection screen in which the plurality of different included angles are cyclically arranged.

The present invention provides a directional reflection screen that is concave in a direction which is at approximately right angles to a ridgeline of ridges of the triangularly-shaped mirror sheet.

Still further particulars of the present invention are set forth below.

A directional reflection screen is provided in which a base of the triangularly-shaped mirror sheet is formed of a polymer material.

A directional reflection screen in provided that includes a first portion for effecting focusing in a direction which is at approximately right angles to the ridgeline of the triangularly-shaped mirror sheet, and a second portion for effecting diffusion in a direction of the ridgeline of the triangularly-shaped mirror sheet.

A directional reflection screen in provided in which the first and second portions of the directional reflection screen are made from independent bases.

A directional reflection screen is provided in which the second portion for effecting diffusion in the direction of the ridgeline of the triangularly-shaped mirror sheet is made from a lens sheet.

A directional reflection screen is provided in which the base of the triangularly-shaped mirror sheet of the first portion of the screen and the base of the lens sheet of the second portion are formed of transmissive polymer materials. The first portion has a triangularly-shaped mirror sheet structure formed on one side and a flat surface formed on the other side. The second portion has a lens sheet structure formed on one side and a flat surface formed on the other side.

A directional reflection screen is provided in which the triangularly-shaped mirror sheet and the lens sheet are formed on outside surfaces of the respective first and second portions by opposing the flat surfaces of the first and second portions to each other.

A directional reflection screen is provided in which a focus of the lens sheet of the second portion of the screen is set at a location other than a mirror surface of the triangularly-shaped mirror sheet of the first portion.

A directional reflection screen is provided in which refractive indices of the polymer materials which respectively form the first and second portions of the screen are approximately equal to each other.

A directional reflection screen is provided in which a transmissive third portion which is approximately equal in refractive index to the polymer material which forms the second portion is inserted between the first portion and the second portion of the screen.

A directional reflection screen is provided in which a material which bonds together the first portion and the second or third portion of the screen has an approximately equal refractive index.

A directional reflection screen is provided in which the directional reflection screen is concave in a direction which is at approximately right angles to the ridgeline of the triangularly-shaped mirror sheet which constitutes the directional reflection screen.

A display system is provided having any of the above-described directional reflection screens and image projecting means.

The display system is such that all different included angle components of the triangularly-shaped mirror sheet are contained in one pixel which constitutes an image signal.

The display system is such that the polymer material which forms the base of the triangularly-shaped mirror sheet is transmissive, and the base has a triangularly-shaped mirror sheet structure formed on one side and a flat surface formed on the other side, an image signal entering the base through the flat surface.

The display system is such that a repetition length of a pixel in a horizontal direction relative to a triangularly-shaped mirror of the image projecting means is an integer times a repetition length of the triangularly-shaped mirror sheet.

The display system is such that a repetition length of a pixel in a vertical direction relative to the triangularly-shaped mirror of the image projecting means is an integer times the repetition length of the lens sheet.

The display system is such that an image of the image projecting means is formed by a matrix-addressed display.

The image projecting means independently project images to be respectively made incident on the left and right eyes of an observer, the images including a binocular parallax so that the observer recognizes a stereoscopic image.

The display system is such that the ridgeline of the triangularly-shaped mirror sheet which constitutes the directional reflection screen is at right angles to the observer.

These and other objects, features and advantages of the present invention will become more apparent in view of the following detailed description of the preferred embodiments in connection with the drawings.

BRIEF DESCRIPTION OF THE DRAWINGS

FIG. 5(b) illustrates a specific implementation in which the mirror sheet is curved to define a circle which passes through the viewers' eyes.

FIGS. 8(b) and 8(c) illustrate the effect of vertical diffusion with a flat mirror sheet and a curved mirror sheet.

DETAILED DESCRIPTION OF THE PREFERRED EMBODIMENTS

The preferred embodiments of the present invention will now be described in connection with the drawings.

Figure 1A:
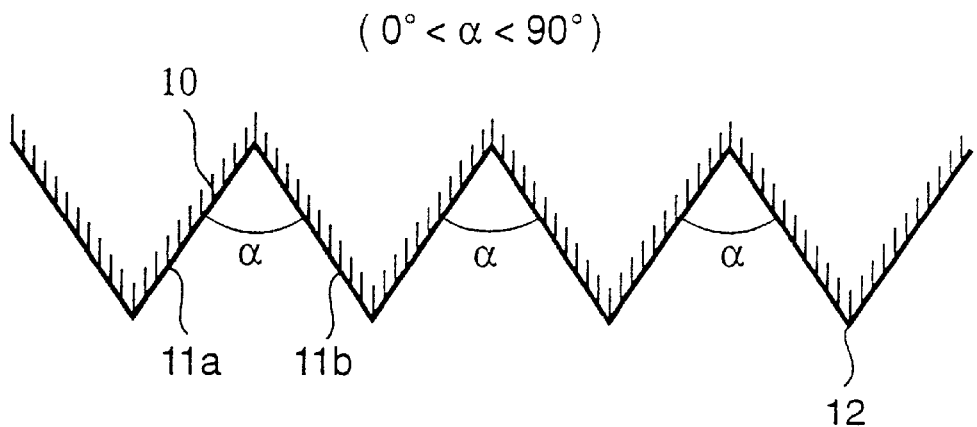
FIGS. 1(a) and 1(b) age enlarged horizontal sectional views of a first embodiment of a triangularly-shaped mirror sheet for a directional reflection screen according to the present invention.
Figure 1B:
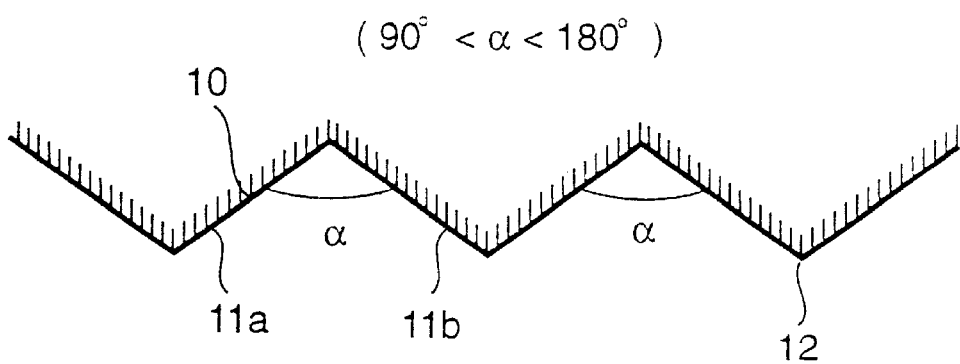

FIGS. 1(a) and 1(b) show horizontal sectional shapes of a first embodiment of a triangularly-shaped mirror sheet for a directional reflection screen according to the present invention. The mirror sheet is shaped to have a plurality of triangularly-shaped projections, or ridges, which extend in the vertical direction and are spaced from each other in the horizontal direction. The ridges define ridgelines at vertex angle portions 12. In a triangularly-shaped mirror sheet 10, which is produced for a stereoscopic display for effecting horizontal focusing on observers, included angle α between each reflection surface 11a and an adjacent reflection surface 11b is selected to be an angle other than 90° (i.e. not a right angle). The specific value of the angle α may be an acute angle, 0°<α<90°, as shown in FIG. 1(a), or an obtuse angle, 90°<α<180°, as shown in FIG. 1(b). If each of the included angles α of the triangularly-shaped mirror sheet 10 is selected to be such a non-right angle, two horizontal focus points are obtained.

Figure 2:
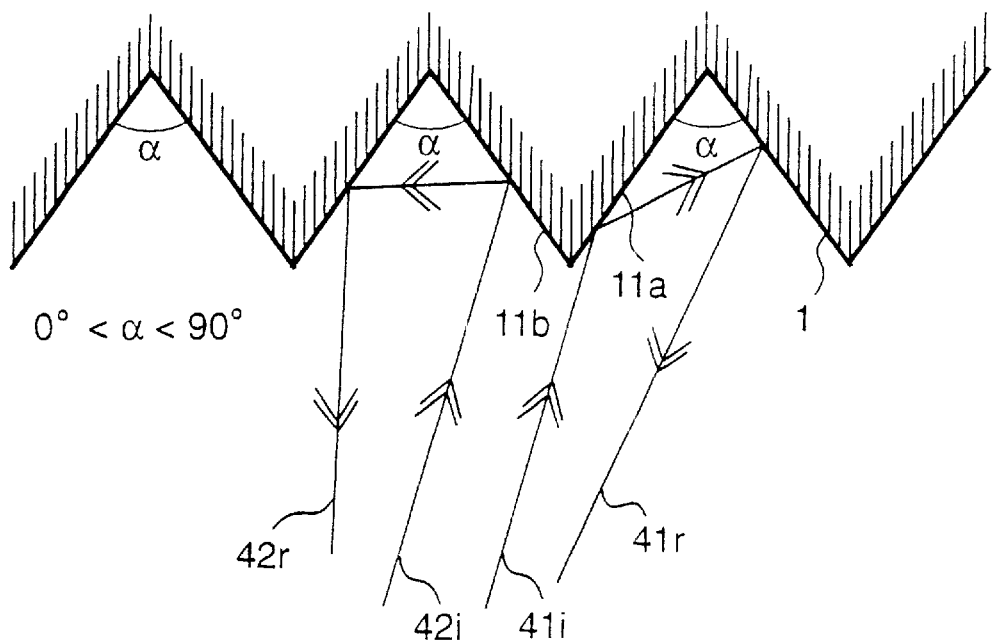
FIG. 2 illustrates a horizontal ray loci in the first embodiment.

For example, if each of the included angles α is an acute angle, the directions in which incident rays 41i and 42i are respectively reflected as reflected rays 41r and 42r differ between the surfaces 11a and 11b of the triangularly-shaped mirror sheet 10 as shown in FIG. 2. Accordingly, as shown in the first embodiment of the display system shown in FIG.

3, if a directional reflection screen S11 incorporates such a triangularly-shaped mirror sheet and an image is projected onto the directional reflection screen S11 by image projecting means 50 including a right-eye projector 50R and a left-eye projector 50L, it is possible to obtain a stereoscopic display which allows two observers 61 and 62 to simultaneously observe a stereoscopic image.

Figure 4:
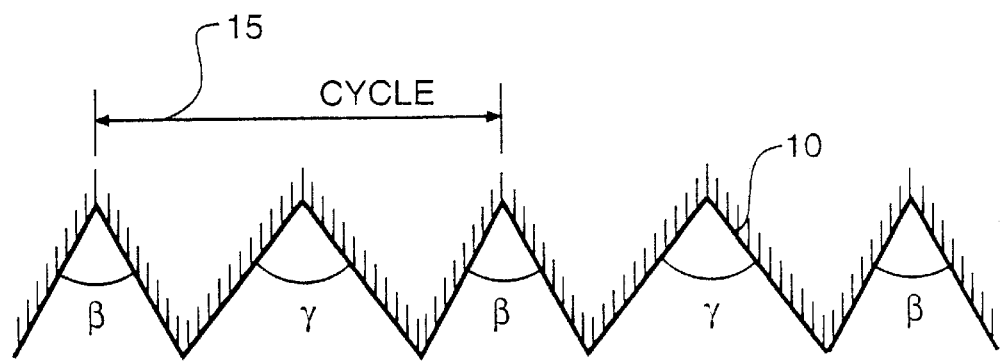
FIGS. 4(a) and 4(b) are enlarged horizontal sectional views showing a second embodiment of the triangularly-shaped mirror sheet for a directional reflection screen according to the present invention.
Figure 4:
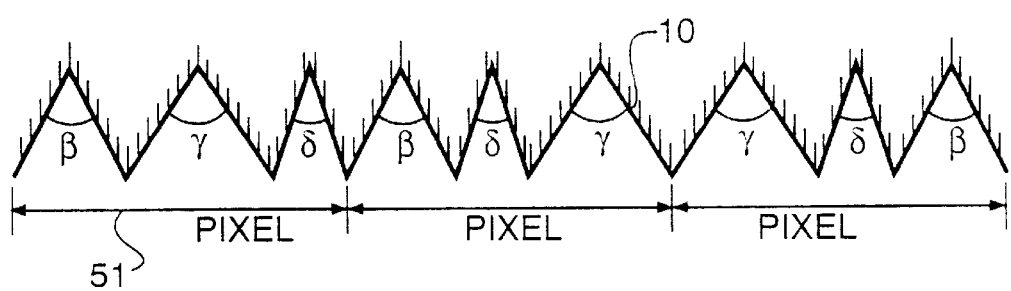

Although the triangularly-shaped mirror sheet 10 for a directional reflection screen shown in FIG. 1 has a single included angle α which is not 90°, if a plurality of triangularly-shaped mirror portions having different included angles β, γ and δ are combined like a second embodiment of the triangularly-shaped mirror sheet 10 for a directional reflection screen, as shown in FIGS. 4(a) and 4(b), it is possible to obtain a stereoscopic display which allows more observers to simultaneously observe a stereoscopic image. For a directional reflection screen S10 including the triangularly-shaped mirror sheet 10 having n different included angles, the number of observers who can observe a stereoscopic display at the same time is (2n−1), if the included angles contains a component of 90°, or, if not, then the number of observers is 2n. In this case, it is important that the plurality of different included angles β, γ and δ which constitute the triangularly-shaped mirror sheet 10 be cyclically arranged as shown in FIG. 4(a), or that all the included angles β, γ and δ are contained in one pixel 51 which forms an image signal, as shown in FIG. 4(b).

The directional reflection screen S10 including the above-described triangularly-shaped mirror sheet 10 can be easily formed by forming a peak-and-valley structure out of a polymer material such as polycarbonate, acrylic resin or fluororesin and depositing a metal or the like having high reflectance such as Al or Ag, by evaporation, sputtering, plating or the like.

Figure 3:
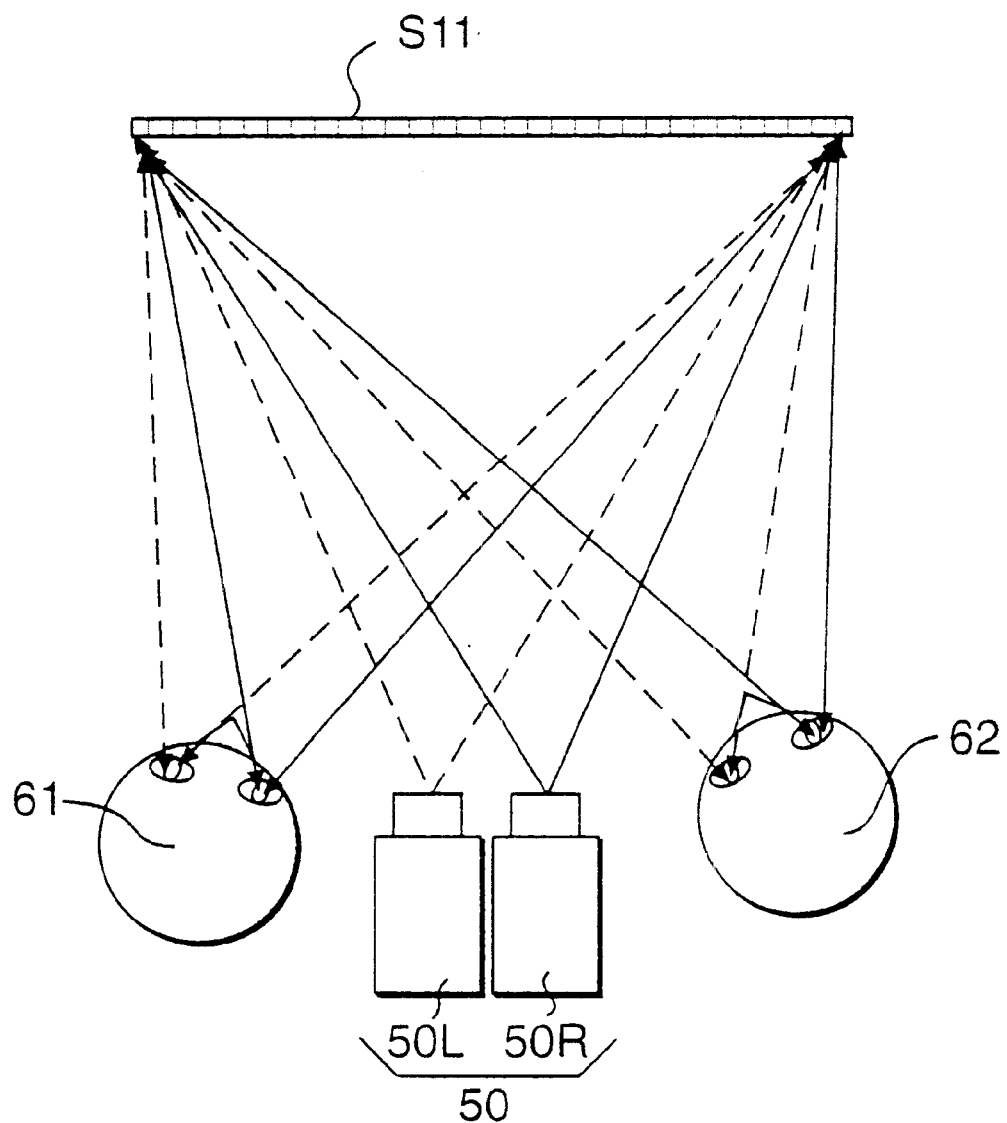
FIG. 3 is a diagrammatic plan view showing a first embodiment of a stereoscopic display system.
Figure 5A:
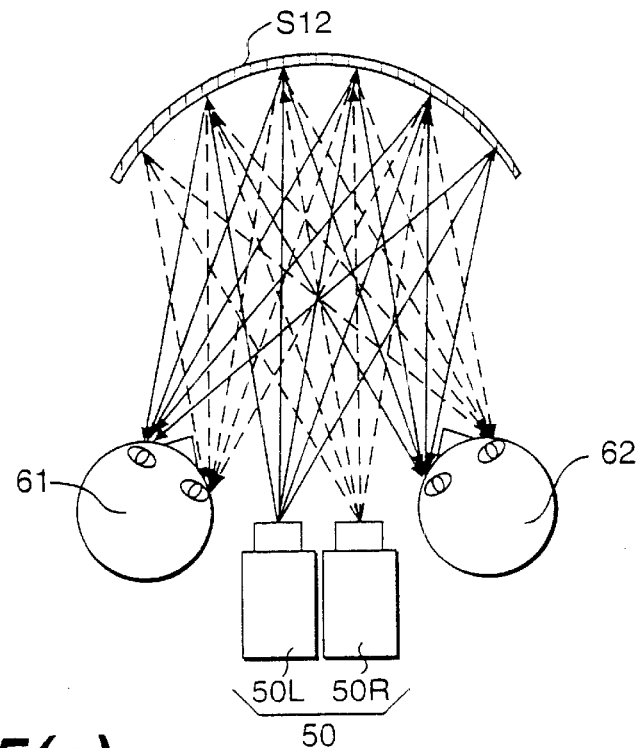
FIGS. 5(a) and 5(b) are diagrammatic plan views showing a third embodiment of the stereoscopic display system where the mirror sheet is curved.
Figure 5B:
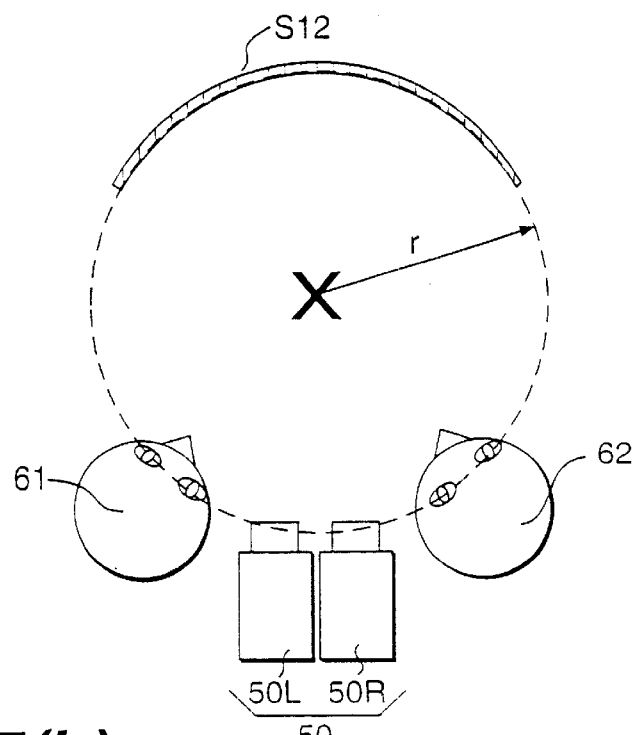

The directional reflection screen may be similar to screen S11 which is formed on a horizontally flat base, as shown in FIG. 3, according to a first embodiment of the stereoscopic display system. However, such a shape causes a slight deviation in a focus point due to a difference in position within the screen, so that an observable screen size is limited. In contrast, as shown in FIGS. 5(a) and 5(b) which illustrate a third embodiment of the stereoscopic display system of the present invention, if a screen S12 has a concave structure in a horizontal direction (in a direction which is perpendicular to ridgelines at vertex angle portions 12 of the triangularly-shaped mirror shown in FIG. 1, for example), it is possible to correct the deviation in focus point. Thus, it is possible to obtain a stereoscopic display having a large screen size. FIG. 5(b) illustrates a preferred embodiment in which a circle defined by the concave screen and having a radius r passes through the eyes of viewers 61 and 62 as well as through left-eye projector 50L and right-eye projector 50R. This is believed to be the optimum position for obtaining the stereoscopic effect.

Figure 6A:
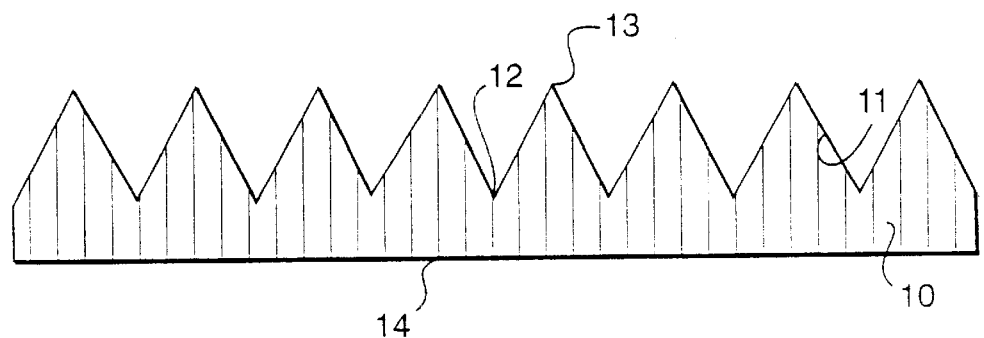
FIGS. 6(a) and 6(b) are views for explaining a manufacturing process of a fourth embodiment of the triangularly-shaped mirror sheet for a directional reflection screen according to the present invention.
Figure 6B:
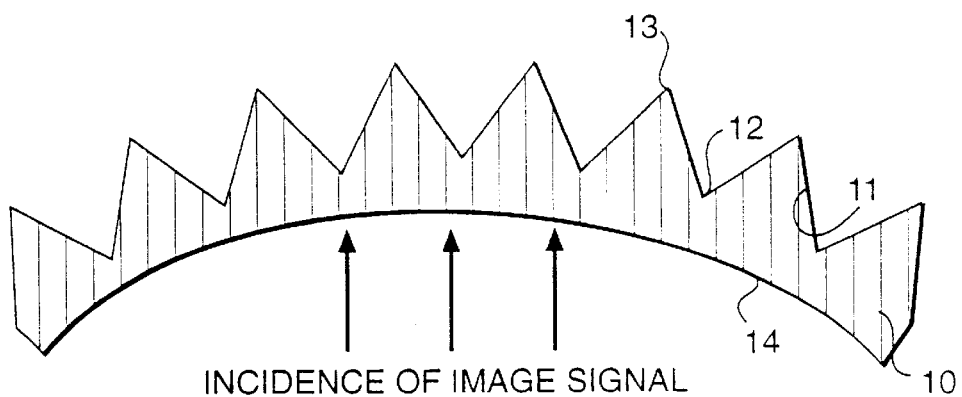
Figure 19:
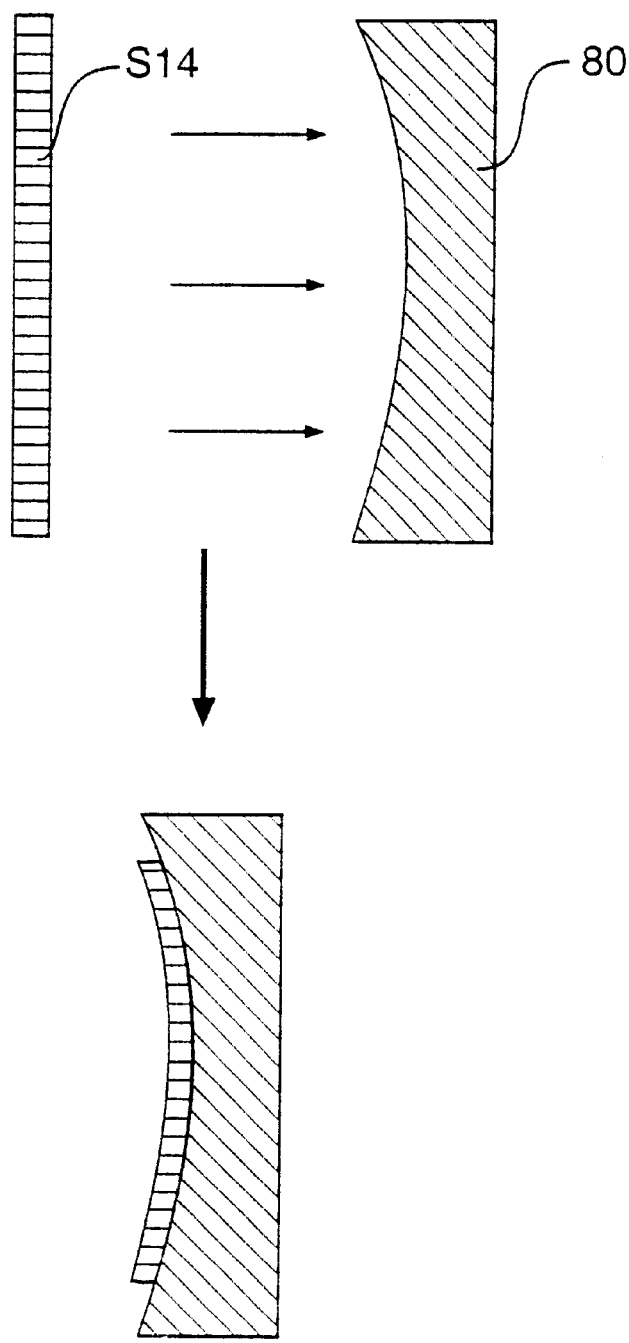
FIG. 19 illustrates a method of forming a curved mirror sheet according to the present invention.

If the screen is to have such a concave structure, it is particularly useful to employ the polymer material which has been described above. In this case, although the screen may be directly formed into the concave structure, a producing method according to a fourth embodiment of the triangularly-shaped mirror sheet 10 shown in FIGS. 6(a) and 6(b) is advantageous. Specifically, first, as shown in FIG. 6(a), a transmissive polymer material is formed into a base which has a flat surface 14 on one side and a triangularly-shaped mirror sheet having desired included angle portions 13 on the other side. Then, as shown in FIG. 6(b), the flat surface 14 which allows incidence of light is bent into a concave shape. In this case, although vertex angle portions 12 which are thinner than the other portions are deformed by stress concentration due to bending, the included angle portions 13 which are thicker than the other portions are retained at the respective included angles. In other words, since the included angle portions which are formed in the beginning are retained even after bending, designing is suitably facilitated. The flat surface 14 needs only to be horizontally flat, and may have a vertical peak-and-valley structure which forms part of, for example, vertical diffusion means. FIG. 19 illustrates a method of bending a screen S14 by pressing it against a base 80.

Figure 7:
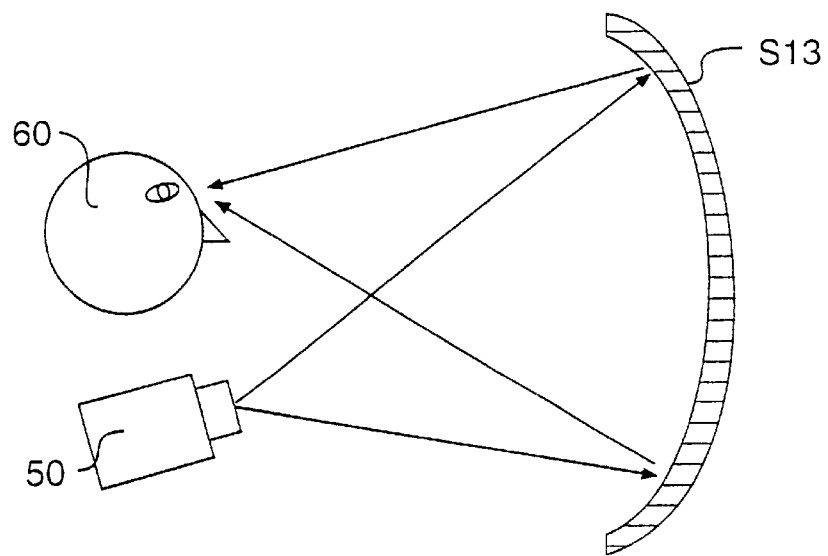
FIG. 7 is a diagrammatic side view showing a fifth embodiment of the stereoscopic display system of the present invention.

FIG. 7 illustrates a fifth embodiment of the stereoscopic display system of the present invention. In FIG. 7, a directional screen S13 employing a triangularly-shaped mirror sheet, as described above, is formed into a vertical concave structure relative to an observer 60 so that an image signal projected on the screen S13 from the projector 50 is focused on one point. This way, the observer 60 can observe the entire screen at a focus point with high luminance. The optimum position is achieved when the distance from the projector to the screen is equal to the distance from the screen to the observer's eyes.

Figure 8A:
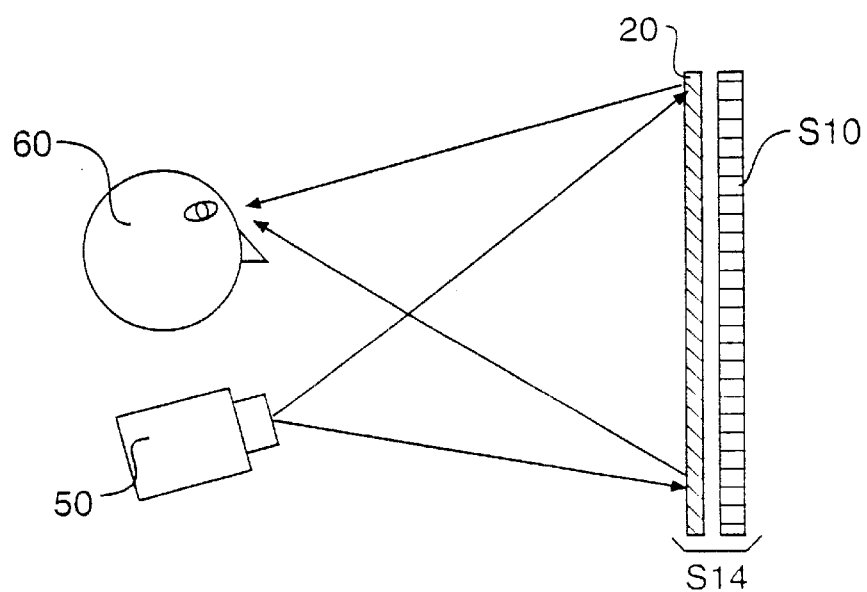
FIGS. 8(a), 8(b) and 8(c) are diagrammatic side views showing a sixth embodiment and a seventh embodiment of the stereoscopic display system according the present invention. In particular.
Figure 8B:
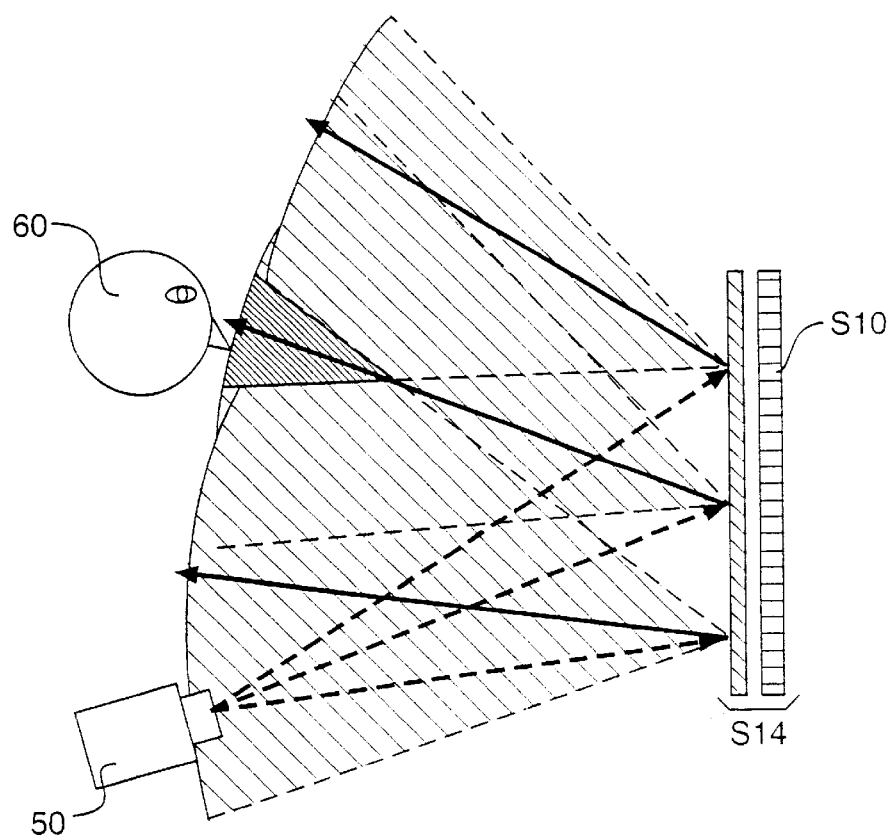
Figure 15:
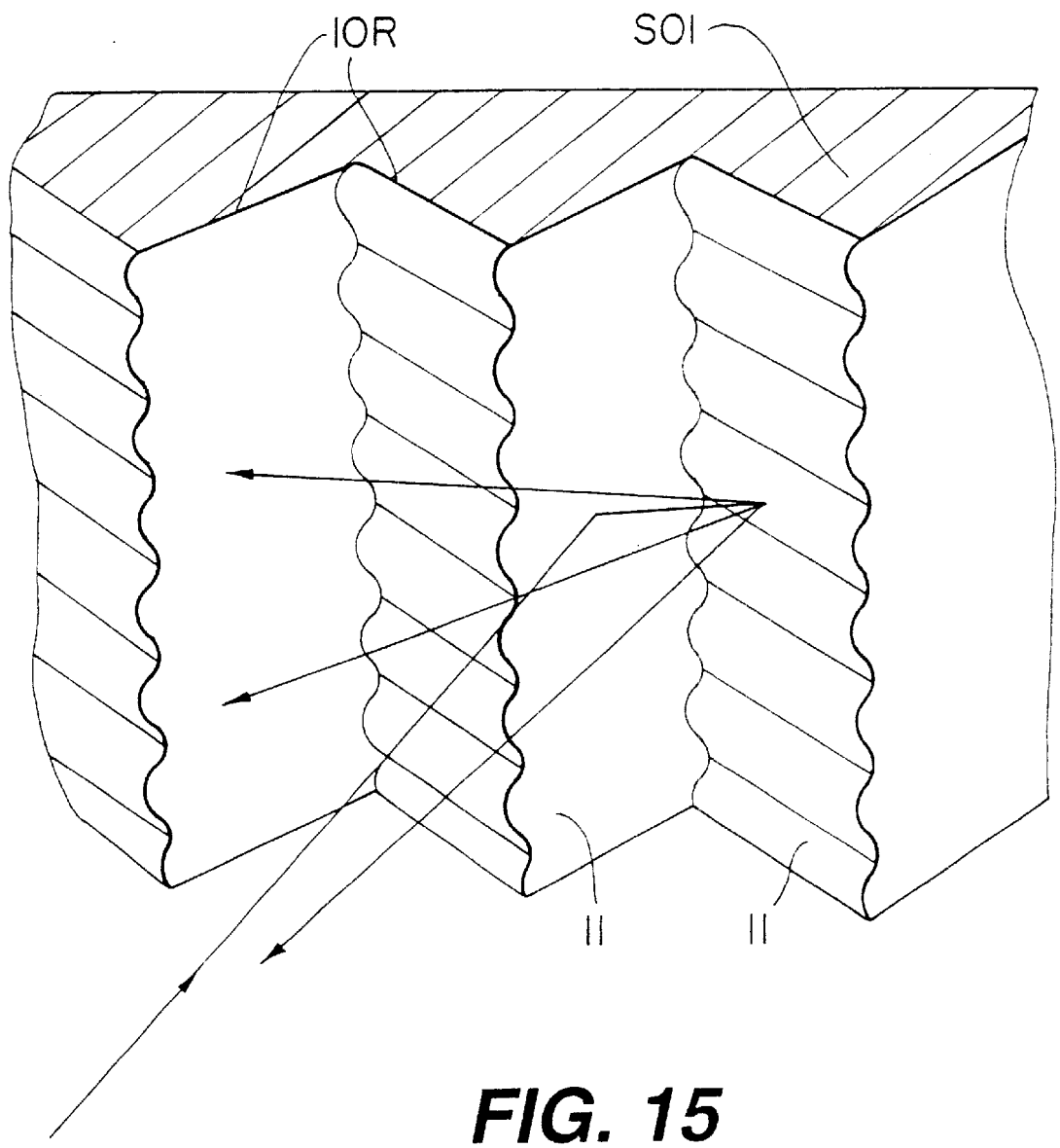
FIG. 15 is an enlarged perspective view illustrating one example of a directional reflection screen according to a prior art.
Figure 16:
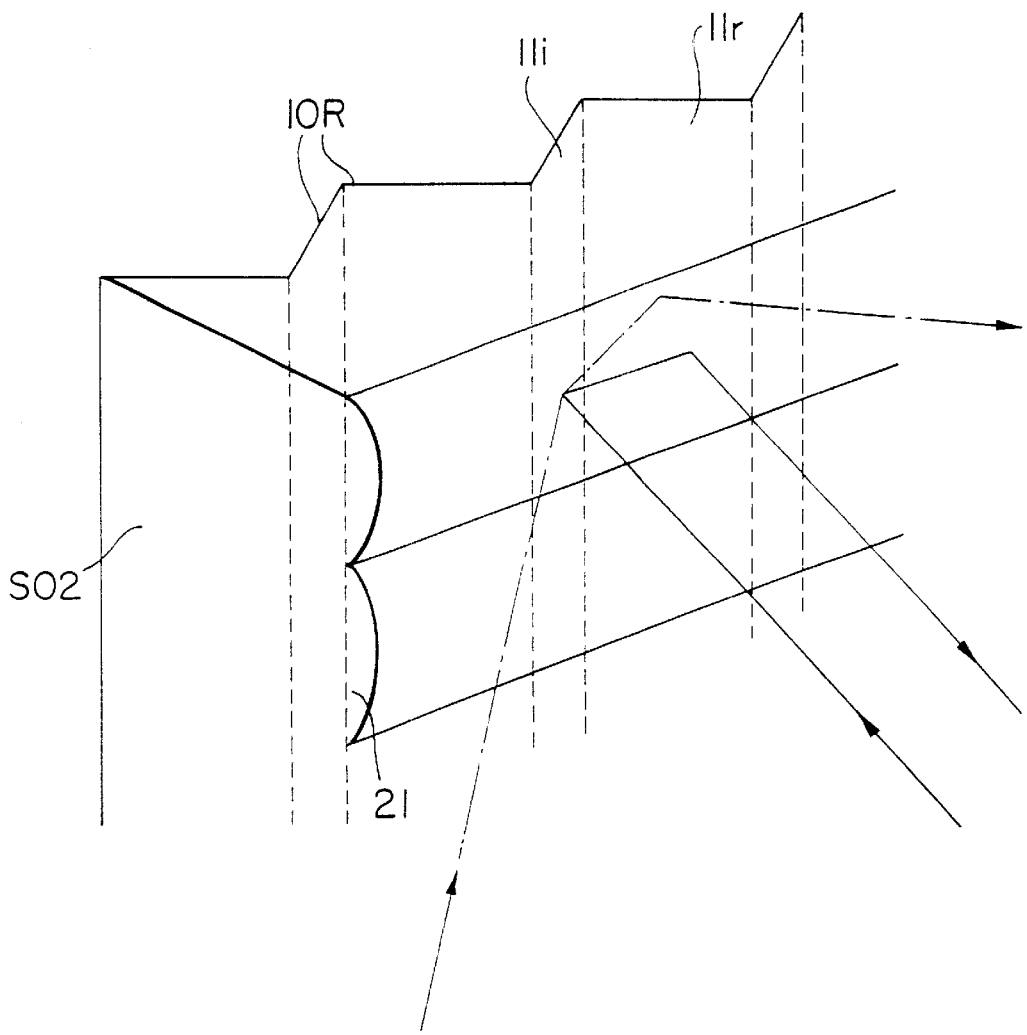
FIG. 16 is an enlarged perspective view illustrating another example of the directional reflection screen according to the prior art.
Figure 17:
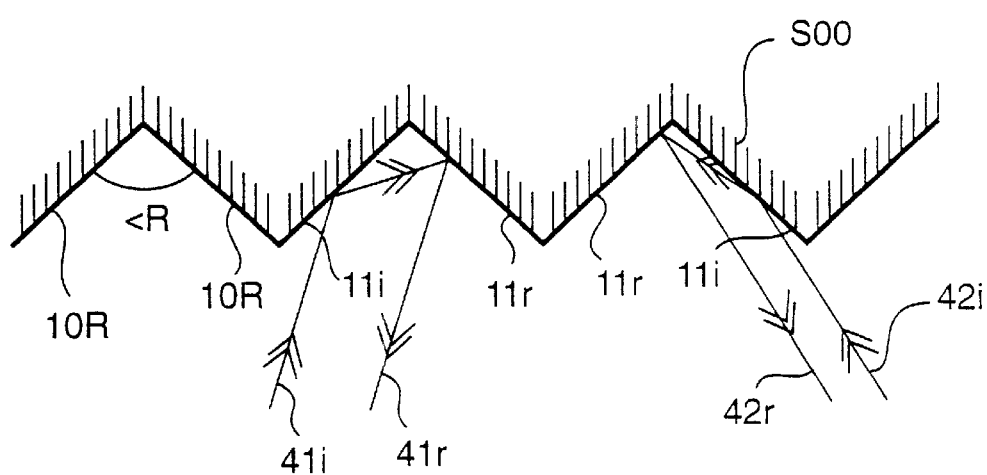
FIG. 17 is a view of horizontal ray loci in a corner-shaped mirror sheet according to the prior art.
Figure 18:
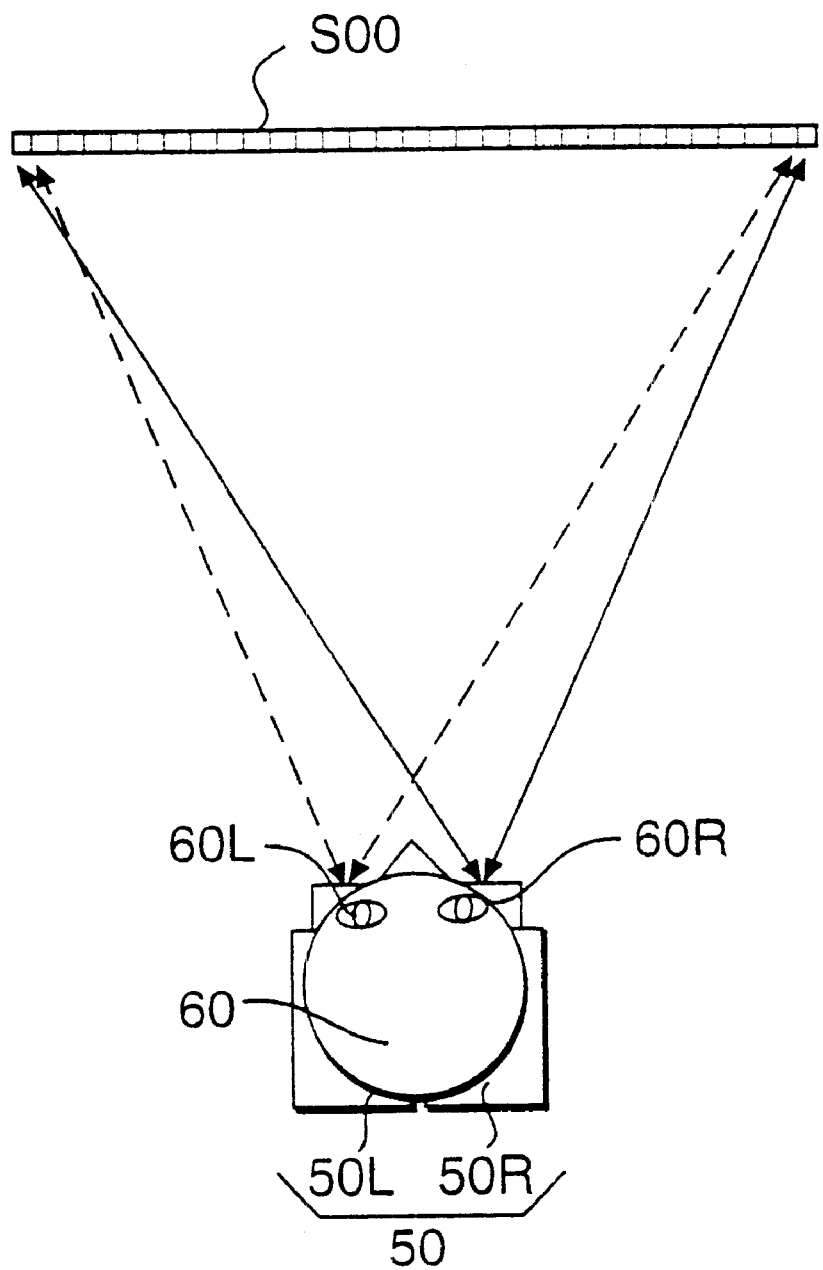
FIG. 18 is a diagrammatic view of the construction of a stereoscopic display according to the prior art.

A sixth embodiment of the display system of the present invention is illustrated in FIGS. 8(a) and 8(b). FIG. 8(b) illustrates the vertical diffusion that occurs in the screen of FIG. 8(a). These Figures illustrate a two-sheet screen in which vertical diffusion means 20 is provided in front of the triangularly-shaped mirror sheet 10 to permit the observer 60 to observe the entire screen with high luminance. The construction of the sixth embodiment as shown in FIGS. 8(a) and 8(b) is suitable because of its vertically wide observable range as compared with the construction of the vertical concave structure shown in FIG. 7. As the vertical diffusion means 20, it is possible to adopt either of the structures of the prior art shown in FIGS. 15 and 16.

Figure 8C:
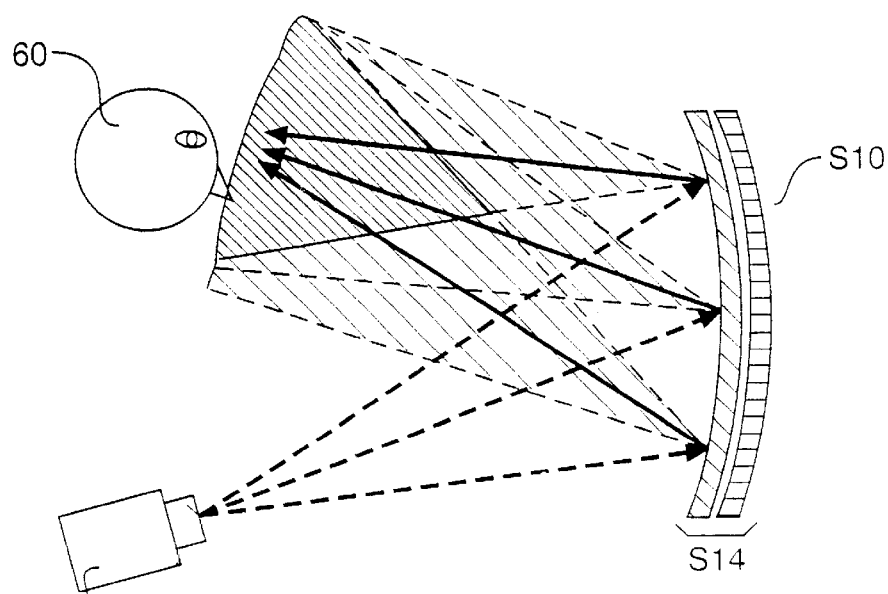

FIG. 8(c) illustrates a seventh embodiment of the stereoscopic display system according to the present invention in which the embodiments of FIG. 7 and FIG. 8(a) are combined. If this is done, optimum results can be achieved.

Figure 9:
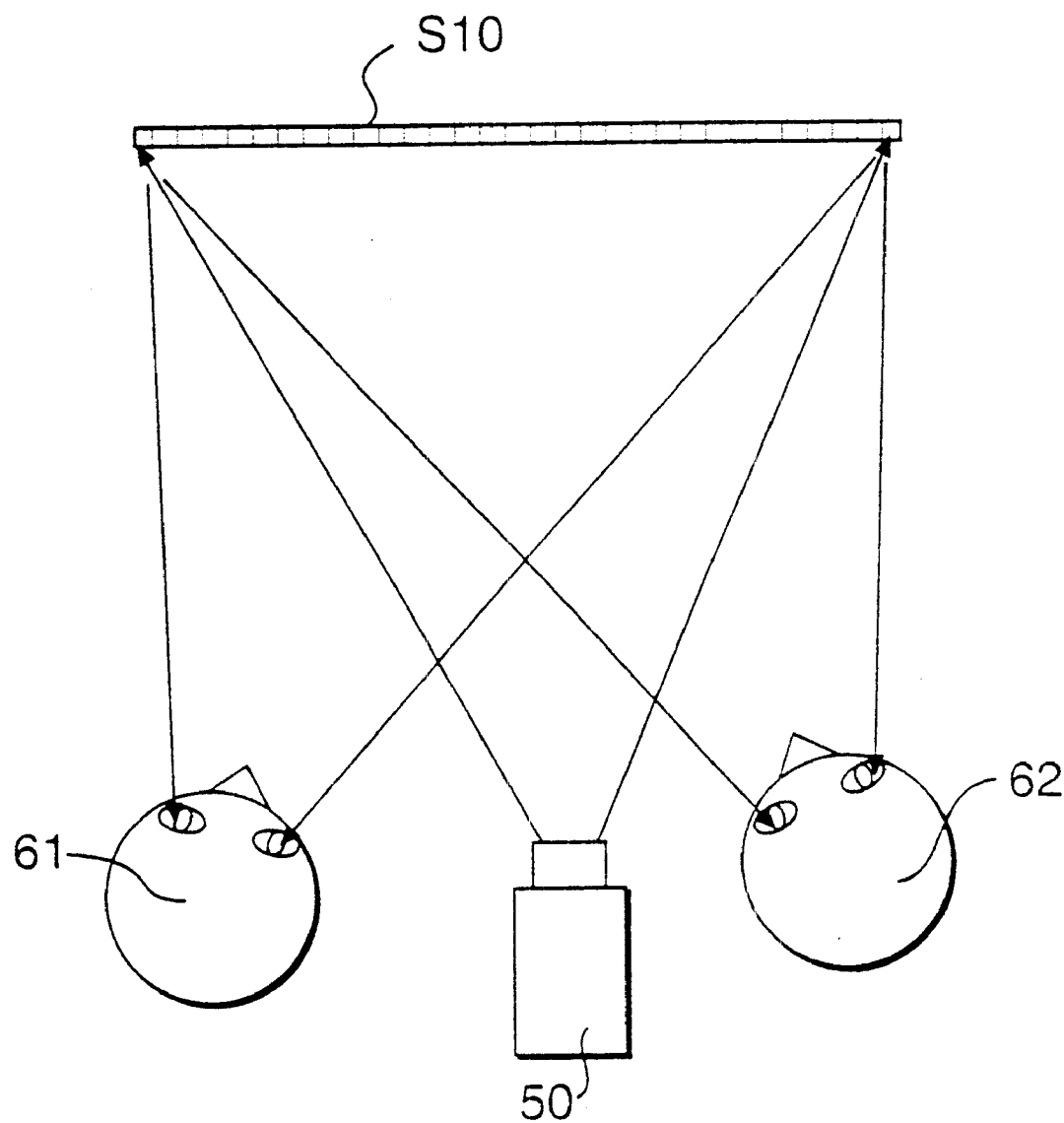
FIG. 9 is diagrammatic plan view showing a eighth embodiment of a stereoscopic display system according to the present invention.

The present invention is not limited to the above-described stereoscopic display. Specifically, if, like a eighth embodiment of the stereoscopic display system shown in FIG. 9, a single apparatus (projector) is used as the image projecting means 50 to project an image signal onto the directional reflection screen S10 which uses a triangularly-shaped mirror sheet according to the present invention, the two observers 61 and 62 can observe a non-stereoscopic projected image at the same time at a plurality of limited observation positions.

A specific structure of the directional reflection screen according to the present invention and a method of producing the same will now be described below.

Figure 10:
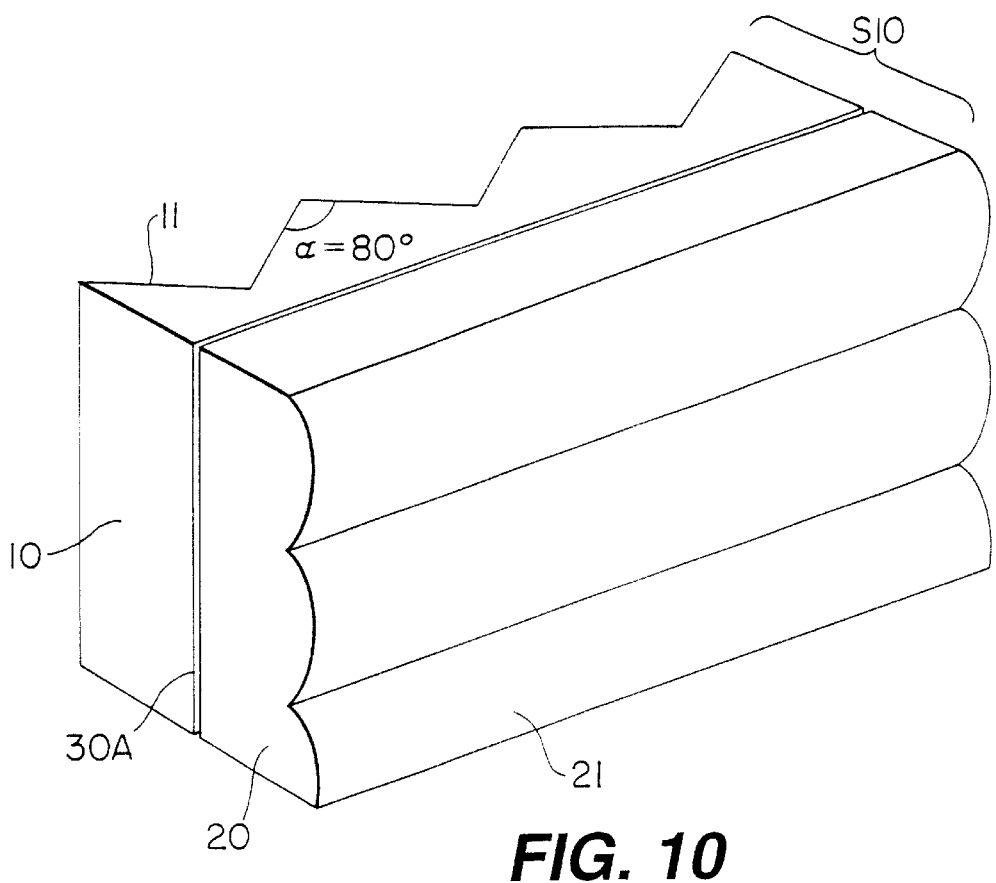
FIG. 10 is an enlarged perspective view illustrating a ninth embodiment of a directional reflection screen.

FIG. 10 is a view showing the construction of a ninth embodiment of the directional reflection screen S10 for the display according to the present invention. In the triangularly-shaped mirror sheet 10, which constitutes horizontal focusing means, a triangularly-shaped mirror sheet base having a peak-and-valley structure is formed, as by a compression molding process which uses a mold and a transmissive polymer material such as polycarbonate, acrylic resin or fluororesin. A mirror surface 11 is formed by depositing a metal, or the like, having high reflectance, such as Al or Ag, on the surface of the peak-and-valley structure, by evaporation, sputtering, plating, or the like. The peak-and-valley structure is formed so that the included angle α of each triangularly-shaped mirror is 80°. Thus, light incident on the triangularly-shaped mirror sheet 10 is reflected in a direction horizontally offset by 20° from the direction of incidence, whereby the horizontal components of the light are focused.

A lens sheet 20 which constitutes vertical diffusion means is produced by forming a lens surface 21 on a transmissive polymer material similar to the one described above. The triangularly-shaped mirror sheet 10 and the lens sheet 20 are bonded together at a bonding surface 30A by an adhesive. According to this embodiment, since the triangularly-shaped mirror sheet 10 which constitutes the focusing means and the lens sheet 20 which constitutes the vertical diffusion means can be separately molded, production is extremely easy. This embodiment also has the following advantages. Since the bonding surface 30A is a flat surface which is opposite to the surface on which is formed the triangularly-shaped mirror sheet structure 10 or the lens sheet structure 20, it is possible to easily produce the triangularly-shaped mirror sheet structure 10, the lens sheet structure 20 and the entire screen. If a material, whose refractive index, when it is cured, approximately coincides with the refractive index of the material which forms either one of the triangularly-shaped mirror sheet 10 and the lens sheet 20, is selected as the adhesive used for bonding the triangularly-shaped mirror sheet 10 and the lens sheet 20 together, unnecessary reflected light at an interface can be preferably suppressed. It is more preferable that the refractive indexes of all the triangularly-shaped mirror sheet 10, the lens sheet 20 and an adhesive 30 are approximately coincident with one another.

Figure 11:
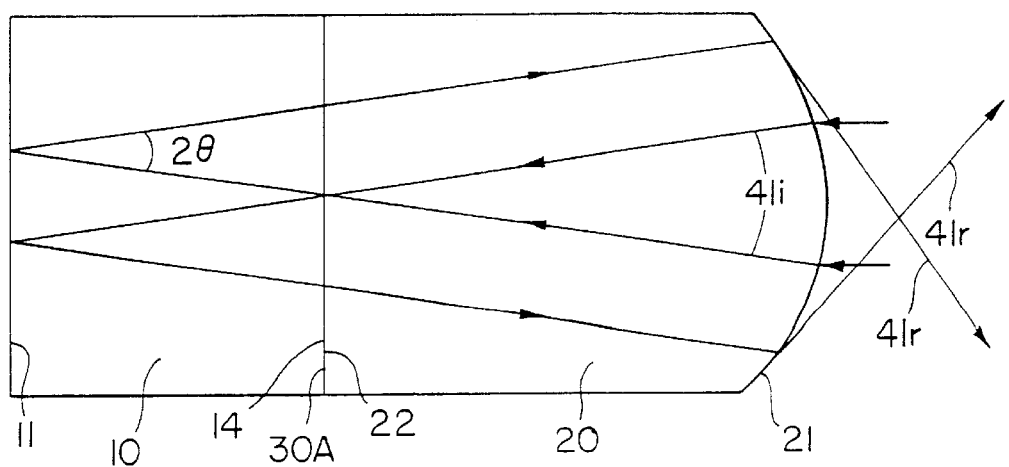
FIG. 11 shows vertical ray loci of the ninth embodiment of the directional reflection screen.

FIG. 11 is a vertical enlarged sectional view of the directional reflection screen S10 of the embodiment shown in FIG. 10, and shows the manner in which the incident light 41i which enters through a lens surface 21 is reflected from the mirror surface 11 and again passes through the lens surface 21 and diffuses as the reflected light 41r. The focus of the lens sheet 20 is set on a flat surface 22 of the base of the lens sheet 20 made of the polymer material, the flat surface 22 being opposite to the lens surface 21. With this setting, the incident light 41i which has been incident on the lens surface 21 at right angles is temporarily focused on the bonding surface 30A, and reaches the mirror surface 11 of the triangularly-shaped mirror sheet 10 at an incident angle θ. Therefore, this light 41i which is reflected twice by the triangularly-shaped mirror sheet 10 returns to the lens 20 with its vertical component subjected to a deflection of angle 2θ, so that the light passes through the lens surface 21 and diffuses in the vertical direction as shown as the reflected light 41r. Incidentally, if the focus of the lens sheet 20 lies on the mirror surface 11 of the triangularly-shaped mirror sheet 10, the vertical diffusion effect cannot be obtained.

Figure 12:
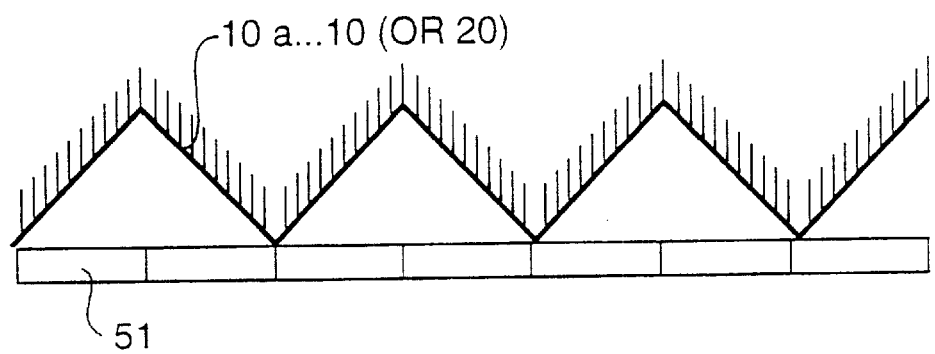
FIGS. 12(a)–12(c) illustrate the relation between the directional reflection screen and the pixel repetition length of the display.
Figure 12:
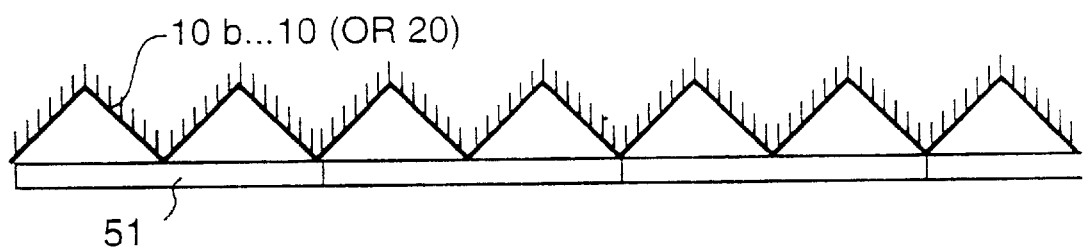
Figure 12:
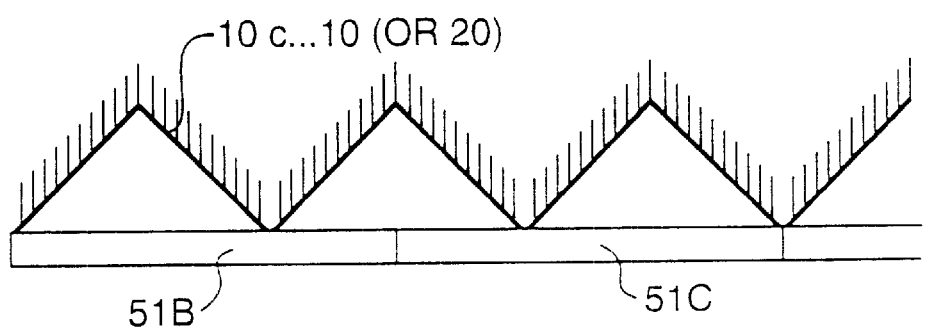

FIGS. 12(a)–12(c) are views illustrating the relation between the repetition length of the pixel 51 projected from the image projecting apparatus (projector) and the repetition length of the triangularly-shaped mirror sheet 10 (or the lens sheet 20). If an image for a plurality of horizontal pixels is projected within one repetition length of the triangularly-shaped mirror sheet 10, the image for such a plurality of pixels is mixed by reflection at the triangularly-shaped mirror sheet 10. In the example shown in FIG. 12(a), since an image for two horizontal pixels is projected within one repetition length of the triangularly-shaped mirror sheet 10, the horizontal resolution of the projected image is reduced to ½. In contrast, as shown in FIG. 12(b), if the repetition length of the horizontal pixel 51 is an integer times (here shown to be two times) that of the triangularly-shaped mirror sheet 10, the resolution of the projected image can be fully reproduced. Finally, as shown in FIG. 12(c), if the ratio of the repetition length of the triangularly-shaped mirror sheet 10 to the repetition length of the horizontal pixel 51 does not have an integral relation, the mixture of the signals of pixels 51B and 51C at boundaries occurs and causes distortion of a reproduced image. Accordingly, it is desirable that the pitch of the triangularly-shaped mirror sheet 10 be an integer times the repetition length of the horizontal pixel 51 of a projected image so that the resolution of the projected image is fully reproduced.

A similar relation applies to a vertical repetition length, and it is desirable that the repetition length of the vertical pixel of a projected image is an integer times the repetition length of the lens surface 21. As is also apparent from the above description, since the definition of the pixel of the screen of the display according to the present invention is discrete, it is desirable to project an image created by a matrix-addressed display in conformity with such discrete definition.

Figure 13:
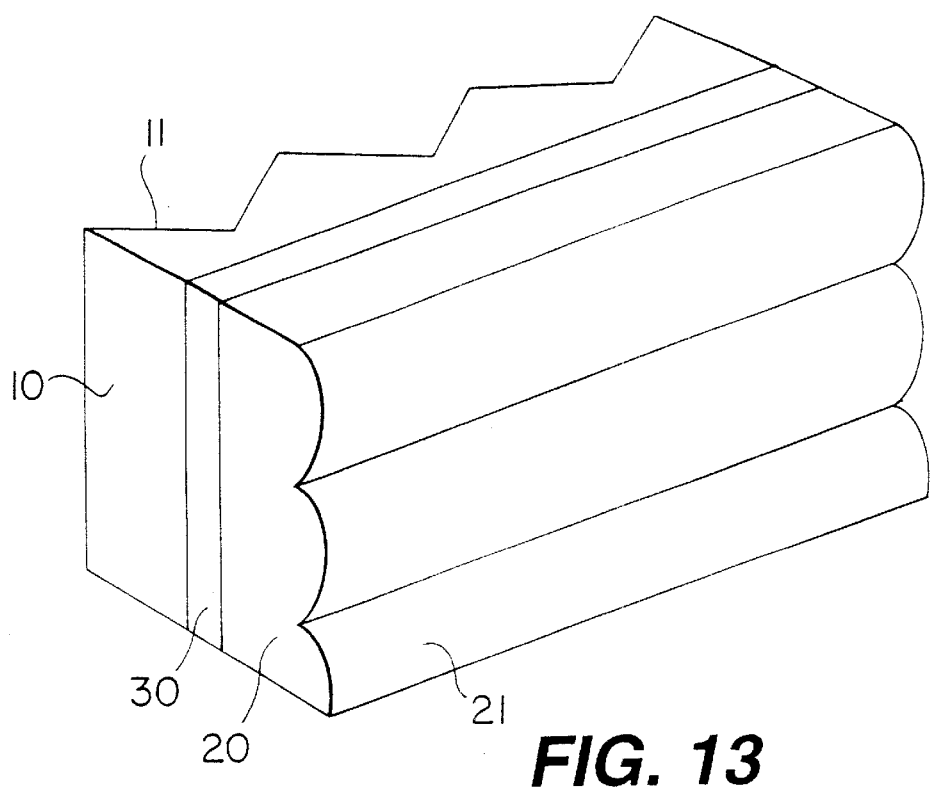
FIG. 13 is an enlarged perspective view illustrating a directional reflection screen assembly.

The structure of a directional reflection screen according to another embodiment of the present invention and a method of producing the same will be described below with reference to FIG. 13. Similarly to the structure of the previous embodiment of FIG. 10, the flat surfaces of two polymer material bases on which are respectively formed the triangularly-shaped mirror sheet 10 which constitutes the horizontal focusing means and the lens sheet 20 which constitutes the vertical diffusion means are opposed to each other. The feature of this embodiment is that a flat plate 30 made of a similar polymer material is sandwiched between the two bases 10 and 20. With this flat plate 30, it is possible to freely adjust the space (distance) between the triangularly-shaped mirror sheet 10 and the lens sheet 20 by changing the thickness of the flat plate 30. Accordingly, it has the advantage that it is possible to easily apply the directional reflection screen to various displays of various sizes or various degrees of vertical diffusion without changing design such as the focal plane of the lens sheet 20.

It is desirable that the polymer material which forms the flat plate 30 be approximately equal in refractive index to each of the materials which form the triangularly-shaped mirror sheet 10 and the lens sheet 20, respectively, so that the effect of reflection of incident light at each bonding interface can be made as small as possible. In addition, if the flat plate 30 is made of a transmissive material having excellent durability, the strength of the entire screen can be enhanced.

Figure 14:
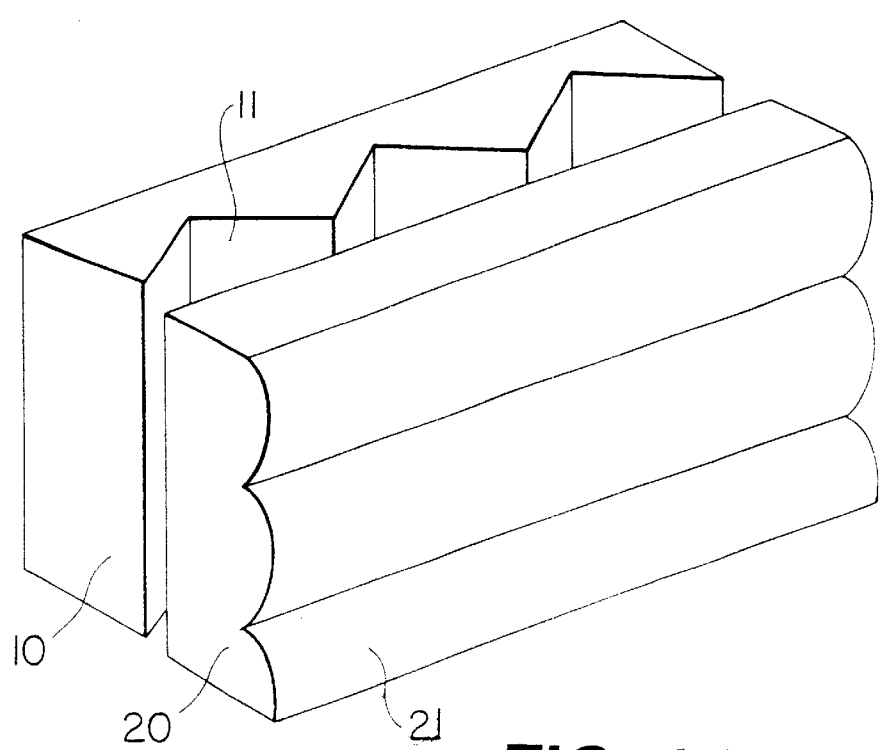
FIG. 14 is an enlarged perspective view illustrating another directional reflection screen assembly.

The structure of a directional reflection screen according to yet another embodiment of the present invention and a method of producing the same will be described below with reference to FIG. 14. In this embodiment, the mirror surface 11 of the triangularly-shaped mirror sheet 10 faces the reverse surface of the base of the lens sheet 20. The triangularly-shaped mirror sheet 10 and the lens sheet 20 are bonded together by a transmissive adhesive. Similarly to each of the embodiments of FIGS. 10 and 13, the structure of the embodiment of FIG. 14 can also be easily produced without the need for integral molding, which can be difficult. Also, the embodiment of FIG. 14 is suitable for preventing external scratches on the mirror surface or the like, because a metal film which forms the mirror surface 11 of the triangularly-shaped mirror sheet 10 is positioned in the space sandwiched between the bases.

Additionally, it is preferable that when the adhesive used for bonding is cured, the refractive index of the adhesive coincides with the refractive index of the material which forms the lens sheet structure. It goes without saying that if a flat plate is sandwiched, it is possible to easily adjust the space between the mirror surface 11 of the triangularly-shaped mirror sheet 10 and the focal length of the lens sheet 20.

As described above, according to the present invention, since a stereoscopic display is constructed in such a manner that a directional reflection screen having a triangularly-shaped mirror sheet with included angles at least part of which are non-right angles is used as horizontal focusing means for observers, it is possible to increase the number of persons who can observe an image at the same time without wearing special glasses and without having to overlap each other in a vertical direction. Furthermore, the use of vertical diffusion along with the horizontal focusing of the triangularly shaped mirror sheet, additional advantages can be realized. The horizontally concave and vertically concave embodiments even further enhance some characteristics.

While the present invention has been described above in connection with the preferred embodiments, one of ordinary skill in the art would be enabled by this disclosure to make various modifications to the preferred embodiments and still be within the scope and spirit of the present invention as recited in the appended claims.

What is claimed is:

1. A display screen comprising a triangularly shaped mirror sheet having a surface with a plurality of triangularly-shaped projections which extend in a vertical direction along the surface and which are provided next to each other in a horizontal direction of the surface, the mirror sheet having a surface of a high reflecting matter so as to act as a mirror wherein an apex of certain ones of the plurality of triangularly-shaped projections form angles that are not equal to 90 degrees; and wherein the plurality of triangularly shaped projections are arranged in groups which periodically repeat themselves in the horizontal direction, and wherein each group contains at least two triangularly shaped projections with different apex angles.

2. The display screen according to claim 1, further comprising vertical diffusion means attached to the mirror sheet.

3. The display screen according to claim 2, wherein the vertical diffusion means is a lens sheet.

4. The display screen according to claim 1, wherein the mirror sheet is curved in the horizontal direction.

5. The display screen according to claim 1, wherein the mirror sheet is curved in the vertical direction.

6. The display screen according to claim 1, wherein the mirror sheet is formed from a polymer.

7. The display screen according to claim 6, wherein the polymer is selected from a group consisting of polycarbonate, acrylic resin and fluororesin.

8. The display screen according to claim 1 wherein an apex of all of the plurality of triangularly shaped projection are at angles that are less than 90 degrees.

9. The display screen according to claim 1 wherein an apex of all of the plurality of triangularly shaped projection are at angles that are greater than 90 degrees.

10. The display screen according to claim 1 wherein an apex of all of the plurality of triangularly shaped projection are at angles that are not equal to 90 degrees.

11. The display screen according to claim 1, further comprising a lens sheet attached to the mirror sheet, wherein the lens sheet and the mirror sheet are formed from polymer materials having approximately equal refractive indexes.

12. The display screen according to claim 11, wherein a transmissive portion is provided between the mirror sheet and the lens sheet, the transmissive portion having a refractive index approximately equal to that of the lens sheet and the mirror sheet.

13. The display screen according to claim 12, wherein a refractive index of a bonding material which bonds together the mirror sheet and the transmissive portion is approximately equal to the refractive index of the mirror sheet.

14. The display screen according to claim 11, wherein the lens sheet has a flat rear surface which is positioned to face a flat rear surface of a base onto which the mirror sheet is formed.

15. The display screen according to claim 14, further comprising a transmissive portion positioned between the lens sheet and the mirror sheet.

16. The display screen according to claim 11, wherein the lens sheet has a flat rear surface which is positioned to face the mirror sheet to prevent damage from occurring to the mirror sheet.

17. The display screen according to claim 11, wherein a refractive index of a bonding material which bonds together the lens sheet and the mirror sheet is approximately equal to the refractive index of the mirror sheet.

18. A display screen comprising a triangularly shaped mirror sheet having a plurality of corner-shaped mirrors, the mirror sheet having a surface of a high reflecting matter so as to act as a mirror characterized in that the plurality of corner-shaped mirrors have at least one corner-shaped mirror whose included angle is a non-right angle; and wherein the plurality of corner-shaped mirrors are arranged in groups which periodically repeat themselves in a given direction, and wherein each group contains at least two different included angles.

* * * * *